(12) United States Patent
Chi et al.

(10) Patent No.: US 9,023,781 B2
(45) Date of Patent: May 5, 2015

(54) PARTICLE DEFOAMER COMPRISING A SILICONE EMULSION AND PROCESS FOR PREPARING SAME

(75) Inventors: Yueqin Chi, Jiangsu (CN); Fei Wu, Jiangsu (CN); Tian Cao, Jiangsu (CN); Qiang Zhang, Jiangsu (CN); Hualan Sui, Jiangsu (CN); Wei Huang, Jiangsu (CN)

(73) Assignee: Nanjing Sixin Scientific-Technological Application Research Institute Co., Ltd. (CN)

( * ) Notice: Subject to any disclaimer, the term of this patent is extended or adjusted under 35 U.S.C. 154(b) by 0 days.

(21) Appl. No.: 13/989,029

(22) PCT Filed: Dec. 14, 2011

(86) PCT No.: PCT/CN2011/083984
§ 371 (c)(1),
(2), (4) Date: May 22, 2013

(87) PCT Pub. No.: WO2013/000249
PCT Pub. Date: Jan. 3, 2013

(65) Prior Publication Data
US 2014/0142020 A1 May 22, 2014

(30) Foreign Application Priority Data

Jun. 29, 2011 (CN) .......................... 2011 1 0178460
Sep. 20, 2011 (CN) .......................... 2011 1 0290327

(51) Int. Cl.
C11D 9/36 (2006.01)
C11D 3/00 (2006.01)
B01D 19/04 (2006.01)
C11D 3/37 (2006.01)
C11D 11/00 (2006.01)

(52) U.S. Cl.
CPC ............. *C11D 3/0026* (2013.01); *B01D 19/04* (2013.01); *C11D 3/37* (2013.01); *C11D 9/36* (2013.01); *C11D 11/00* (2013.01)

(58) Field of Classification Search
USPC ......... 510/276, 317, 343, 347, 349, 466, 438, 510/444
See application file for complete search history.

(56) References Cited

U.S. PATENT DOCUMENTS

| 4,894,177 A | 1/1990 | Starch ...................... 252/174.15 |
| 5,589,449 A * | 12/1996 | Kolaitis et al. ................ 510/466 |
| 5,861,368 A * | 1/1999 | Kolaitis et al. ................ 516/118 |
| 6,165,968 A * | 12/2000 | Lenoble ....................... 510/466 |
| 6,610,752 B1 | 8/2003 | Schmid et al. ................ 516/117 |
| 2003/0211961 A1 | 11/2003 | Lai et al. ..................... 510/475 |

FOREIGN PATENT DOCUMENTS

| CN | 1177630 | 4/1998 | ............ C11D 3/37 |
| CN | 101062468 | 10/2007 | ............ B01D 19/04 |
| CN | 101721843 | 6/2010 | ............ B01D 19/04 |
| CN | 101991976 | 3/2011 | ............ B01D 19/04 |
| EP | 0142910 | 5/1985 | ............ C11D 3/00 |
| EP | 0329842 | 8/1989 | ............ C11D 3/00 |
| EP | 0496510 | 7/1992 | ............ C11D 3/37 |
| EP | 636685 | * 1/1995 | |
| EP | 0636685 | 2/1995 | ............ C11D 3/12 |
| EP | 0718018 | 6/1996 | ............ B01D 19/04 |
| EP | 0995473 | 4/2000 | ............ B01D 19/04 |
| EP | 1070526 | 1/2001 | ............ B01D 19/04 |
| EP | 1075863 | 2/2001 | ............ B01D 19/04 |
| EP | 1075864 | 2/2001 | ............ B01D 19/04 |
| EP | 1118655 | 7/2001 | ............ C11D 3/20 |
| WO | WO9716519 | 5/1997 | ............ C11D 3/37 |
| WO | WO2005058454 | 6/2005 | ............ B01D 19/04 |
| WO | WO2005058455 | 6/2005 | ............ B01D 19/04 |
| WO | WO2008043512 | 4/2008 | ............ B01D 19/04 |

OTHER PUBLICATIONS

International Search Report issued in corresponding application No. PCT/CN2011/083984, dated Apr. 5, 2012 (4 pgs).

* cited by examiner

*Primary Examiner* — Charles Boyer
(74) *Attorney, Agent, or Firm* — Hayes Soloway P.C.

(57) ABSTRACT

A process for preparing a particle defoamer. The particle defoamer of 55%-75% of a carrier, 15%-35% of a silicone emulsion, 3%-10% of a texturing agent and 2%-10% of a solvent, based on the total weight of the particle defoamer; the process for preparing the particle defoamer is: (1) first adding a carrier A1 into a mixer, and then adding thereto a silicone emulsion B1, and stirring uniformly; (2) adding a carrier component A2 to the mixture obtained in (1), and stirring uniformly; (3) adding a silicone emulsion B2 to the mixture obtained in (2), and, after uniformly stirring, adding the solvent thereto and stirring uniformly; and (4) pelleting and drying by baking the mixture obtained in (3), so as to produce the product.

10 Claims, No Drawings

PARTICLE DEFOAMER COMPRISING A SILICONE EMULSION AND PROCESS FOR PREPARING SAME

FIELD OF THE INVENTION

The present invention relates to a granular defoamer and a method for preparation of the granular defoamer. Defoamers belong to fine chemical additives; therefore, the present invention belongs to the technical field of fine chemicals.

BACKGROUND OF THE INVENTION

Industrial cleaning agents are used in industrial cleaning process to remove filth and reduce oil-water surface tension. Cleaning agents contain a large quantity of surfactant. In the agitation process, the surfactant will be absorbed around the bubbles to stabilize the bubbles, and thereby produce a large quantity of foams. Such a phenomenon is prominent in industrial processes such as cleaning of beer bottles, cleaning of heat-exchange equipment, boilers, and heat exchange pipelines, cleaning of steel sheets, cleaning of machines, and cement and starch pasting, etc. The existence of foams will cause degraded productivity, waste of raw materials and products, prolonged reaction period, degraded product quality, and environment pollution, etc. Therefore, foam elimination is of great importance. In industrial processes, defoamers are often added to eliminate foams.

Defoamers are mainly categorized into organic silicon defoamers and non-organic silicon defoamers by the active component. Most defoamers in heavy-duty powder detergent and heavy-duty liquid detergent products for drum-type washing machines are organic silicon defoamers, and siloxane defoamers are deemed as very effective in that application, because they can be used in low dosage and are not affected by water hardness; in contrast, conventional defoamer compositions, such as soaps, have certain requirements for water hardness. Most of best-selling organic silicon defoamers in the market are liquid products, and have drawbacks such as poor compatibility with the products to be defoamed and narrow applicability, etc., owing to the fact that they can not be added to solid products because they have high water content. In the cleaning industry, solid defoamers have their unique advantages.

Many research and development efforts have been made for solid defoamers: patent documents EP0496510A1 and EP1070526A2 introduce fatty acid, fatty alcohol, alkyl phosphoric acid, and nonpolar hydrocarbon additives with melting point 30~100° C. as antifoaming ingredients; though these ingredients can form intermittent wax coating to encapsulate the active substances, they can not completely solve the problem of uneven distribution of the defoaming active substances; in EP1075863 and WO2005058454, the defoaming performance is enhanced by introducing a hydrophobic organic liquid; in WO2005058455, the foam elimination and suppression performance is enhanced by introducing a non-polar additive with melting point 35~100° C. and a non-silicon organic liquid; in EP1118655A1, the foam suppression performance of a silicone foam-controlling component is improved by adding oleyl alcohol; EP1075864A2 and WO2008043512 mainly introduce the organic silicon active substance, and do not put forth any restriction on the particle size of the carrier, such as sodium carbonate, sodium sulfate, sodium tripolyphosphate, and sodium borate. The particle can not absorb enough active substances and can not attain the expected defoaming effect if the particle size is too small; in addition, these patent documents do not describe how to make the active substances more easily to disperse and evenly agglomerate to the carrier; EP0636685A2, EP0718018A2, EP0995473A1, EP329842, U.S. Pat. No. 5,861,368, U.S. Pat. No. 6,165,968, WO 9716519A1, and U.S. Pat. No. 6,610,752 describe defoamers with zeolite as the carrier; viewed from the composition and structure, zeolite is in a porous "cage-type" structure, which can easily "trap" the defoaming active substances and will not give full play to the defoaming effect of the active substance. A large number of literatures have shown: the activity of defoamers with zeolite as the carrier will decay as the storage time increases. There are many counter measures against that problem: for example, encapsulate the active substances with protective film; introduce silicone polyether, so that the silicone polyether is absorbed to the carrier in advance to block up the porous structure of zeolite, or add wax substance that can form intermittent coating, etc.; however, all these measures can not completely solve the decay problem of the defoamers. CN1177630A describes a solid carrier based granular defoamer that can produce an alkaline pH when it is exposed to water, but the defoamer tends to absorb moisture when it is laid aside; EP142910 discloses the application of a water soluble or water dispersible organic carrier, which contains a first organic carrier component with melting point at 38~90° C. and a second carrier component selected from oxyethylated non-ionic surfactant that achieves hydrophile-lipophile balance at 9.5~13.5° C. and has melting point at 5~36° C.; U.S. Pat. No. 4,894,177 describes a granular defoamer with modified cellulose as the carrier; US2003211961 describes a defoamer with the polymer, copolymer, or mixture of one or more acrylic resins as the carrier. In addition, the defoaming performance of all above defoamers has to be improved further.

Most of the solid defoamers described in above patent documents utilize carrier selection or utilize a combination of silicone grease and other auxiliary agents to attain the balance of foam elimination and suppression. However, these defoamers can not achieve ideal foam control effect in the early stage and late stage of washing, and can not ensure defoaming stability of the product, because it is difficult to achieve even distribution of the silicone grease in carrier if the silicone grease is not emulsified and dispersed in advance. It is a great concern of many specialists and scholars on how to achieve high foam control performance in the early stage and late stage of washing while maintaining defoaming stability of the product.

The inventor utilizes silicone emulsion to replace silicone grease and controls the silicone emulsion to agglomerate to the carrier in steps, forming two silicone grease adsorption "layers"; in that way, the problems of extremely high concentration gradient of silicone grease and uneven distribution of silicone grease resulted from agglomeration in one operation are alleviated, and enough defoaming component exists in the exterior part and interior part of the defoamer particles, achieving a slow release effect; hence, the foam elimination and suppression performance and stability of the product are improved. The prepared solid granular defoamer attains a preferable foam elimination and suppression effect in cleaning processes, such as cleaning of beer bottles, cleaning of heat-exchange equipment, boilers, and heat exchange pipelines, cleaning of steel sheets, cleaning of machines, cement and starch pasting, and powder detergent industry.

SUMMARY OF THE INVENTION

Technical problem to be solved: The present invention provides a method for preparation of solid granular defoamer, with which a solid granular defoamer with improved foam elimination and suppression performance and improved stability can be obtained. The defoamer described in the present invention can maintain favorable foam elimination and suppression effect in the early stage and late stage of washing process, when it is used in powder detergents. In addition, the product has superior defoaming stability.

Technical Solution

The present invention provides a granular defoamer and a method for preparation of the granular defoamer: two silicone grease adsorption "layers" are formed by controlling silicone emulsion to agglomerate to the carrier in steps; thus, the problems of extremely high concentration gradient of active substances and uneven distribution of silicone grease resulted from agglomeration in one operation are alleviated, and the foam elimination and suppression performance and stability of the product are improved.

The granular defoamer described in the present invention comprises the following components:

A. Carrier

The carrier is selected from sulfate, carbonate, phosphate, polyphosphate, starch, cellulose or aluminosilicate, which are solid at room temperature; preferably, the carrier is starch, or sulfate or carbonate with particle size greater than 300-mesh; sulfate and carbonate with particle size smaller than 300-mesh are not recommended for the carrier in the present invention, owing to their low adsorption force. They can be used separately or in mixture, dosed at 55~75% of total mass of the granular defoamer.

The carrier in the present invention is added in two parts, which are denoted as A1 and A2 respectively; the mass ratio of A1 to A2 is 4:1~15:1.

B. Silicone Emulsion

The silicone emulsion is prepared from silicone grease, silicone polyether, emulsifying agent, and deionized water; the method for preparation can be found in existing professional literatures. The silicone emulsion is dosed at 15~35% of total mass of the granular defoamer.

(1) Silicone grease: obtained from reaction of organopolysiloxane, silicone resin, silicon dioxide, hydrophobic treatment agent, and basic catalyst. The method for preparation can be found in existing professional literatures. The silicone grease is dosed at 20%~40% of total mass of the silicone emulsion.

(2) Silicone polyether: prepared from additive reaction of hydrogen-containing polysiloxane and unsaturated polyether under the action of an acidic catalyst; the method for preparation can be found in existing professional literatures. The silicone polyether has 10~30,000 mPa·s kinetic viscosity at 25° C., preferably has 60~5,000 mPa·s at 25° C. It is dosed at 5%~10.5% of total mass of the silicone emulsion.

(3) Emulsifying agent: a non-ionic surfactant. It is dosed at 2%~7.5% of total mass of the silicone emulsion.

(4) Deionized water: dosed at 3%~80% of total mass of the silicone emulsion.

The silicone emulsion is added in two parts, which are denoted as B1 and B2 respectively; the mass ratio of B1 to B2 is 4:1~10:1.

C. Texturing Agent

Commonly used texturing agents include: (1) acrylic polymer, including polyacrylic acid and sodium polyacrylate, and copolymer of maleic acid and acylic acid; (2) cellulose ether, which refers to water soluble or water swellable cellulose ether, including sodium carboxymethylcellulose; (3) citric acid or citrate, including sodium citrate and potassium citrate; (4) polyvinylpyrrolidone.

Such texturing agents can be used separately, or used in mixture at any mix ratio. The texturing agent is dosed at 3~10% of total mass of the granular defoamer.

D. Solvent

The evaporation of solvent will create cavities in the solid particles, and thereby increasing the specific surface area of the solid particles. The solvents comprise alcohol and water, such as methanol, ethanol, or isopropanol, preferably ethanol and water. They can be used separately, or used in mixture at any mix ratio. The solvent is dosed at 2~10% of total mass of the granular defoamer.

The method for preparation of granular defoamer comprises the following steps:

(1) adding carrier A1 into a mixer, and then adding silicone emulsion B1 into the mixer and stirring uniformly;

(2) adding carrier component A2 into the mixture obtained in step (1), and stirring uniformly;

(3) adding silicone emulsion B2 into the mixture obtained in step (2) and after uniformly stirring, adding the texturing agent and stirring uniformly, and adding the solvent and stirring uniformly;

(4) pelleting and drying the mixture obtained in step (3) and the obtained mixture is the prepared granular defoamer.

Beneficial effects: in the present invention, since the silicone grease is emulsified into silicone emulsion in advance, the problems of difficulty in dispersion of silicone grease and uneven distribution after agglomeration to the carrier are alleviated, and the quality homogeneity of defoamer is ensured; moreover, since the silicone emulsion is added into the carrier in steps, the problem of extremely high concentration gradient of silicone grease resulted from agglomeration in one operation is solved, and foams can be eliminated fully in the early stage and the active substances can be released for prolonged time in the entire process; therefore, the foam elimination and suppression is complete in the entire washing process, and thereby the continuous defoaming stability of the product is improved.

DETAILED DESCRIPTION OF THE EMBODIMENTS

The defoaming active substances obtained with the preparation method described in Example 1 and Example 2 in ZL200610040821.3 are high-viscosity silicone grease mixture G1 and high-viscosity silicone grease mixture G2 respectively.

Prepare silicone polyether $E_1$, $E_2$, $E_3$, $E_4$, $E_5$ and $E_6$; the structural formula is:

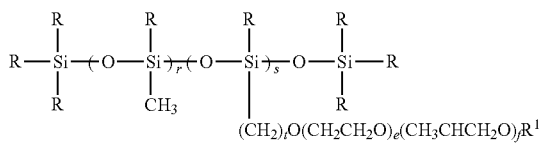

Where, the values of R, $R^1$, r, s, e, f and i are shown in Table 1:

TABLE 1

Silicone Polyether $E_1$, $E_2$, $E_3$, $E_4$, $E_5$ and $E_6$

| | Silicone polyether | | | | | |
|---|---|---|---|---|---|---|
| | $E_1$ | $E_2$ | $E_3$ | $E_4$ | $E_5$ | $E_6$ |
| R | —$CH_3$ | —$C_2H_5$ | —$CH_3$ | —$C_3H_7$ | —$C_2H_5$ | —$CH_3$ |
| R1 | —H | —$CH_3$ | —$C_2H_5$ | —$CH_3$ | —$C_2H_5$ | —H |
| r | 2 | 152 | 84 | 195 | 22 | 10 |
| s | 3 | 45 | 26 | 38 | 24 | 5 |
| e | 48 | 22 | 2 | 15 | 25 | 44 |
| f | 30 | 24 | 46 | 3 | 4 | 28 |
| t | 3 | 4 | 2 | 6 | 3 | 4 |

1. Preparation of Silicone Emulsion (1) Preparation of Silicone Emulsion S1:

At room temperature, mix 20 parts of G1, 1.5 parts of Peregal O-25, 0.5 parts of sorbitan monooleate, 3 parts of silicone polyether $E_2$, and 3 parts of silicone polyether $E_1$ and heat up to 70° C. while stirring, and let them to emulsify and mix completely for 35 min.; then, keep the temperature of the system at 70° C., add water slowly, and increase the stirring rate to invert the water-in-oil emulsion to oil-in-water emulsion, continue adding water to the required mass concentration (50%). Emulsify further the mixture in a colloidal mill, to obtain the required silicone emulsion S1.

(2) Preparation of Silicone Emulsion S2:

At room temperature, mix 30 parts of G2, 4.5 parts of Peregal O-15, 3 parts of sorbitan monooleate, 2.5 parts of silicone polyether $E_1$, and 4 parts of silicone polyether $E_3$ and heat up to 80° C. while stirring, and let them to emulsify and mix completely for 40 min at 80° C.; then, keep the temperature of the system, add water slowly, and increase the stirring rate to invert the water-in-oil emulsion to oil-in-water emulsion, continue adding water to the required mass concentration (60%). Emulsify further the mixture in a colloidal mill, to obtain the required silicone emulsion S2.

(3) Preparation of Silicone Emulsion S3:

At room temperature, mix 20 parts of G2, 20 parts of G1, 4.5 parts of Peregal O-15, 3 parts of sorbitan monooleate, 4.5 parts of silicone polyether $E_3$, and 6 parts of silicone polyether $E_4$ and heat up to 80° C. while stirring, and let them to mix completely for 40 min at 80° C.; then, keep the temperature of the system, add water slowly, and increase the stirring rate to invert the water-in-oil emulsion to oil-in-water emulsion, continue adding water to the required mass concentration (70%). Emulsify further the mixture in a colloidal mill, to obtain the required silicone emulsion S3.

(4) Preparation of Silicone Emulsion S4:

At room temperature, mix 20 parts of G2, 20 parts of G1, 4.5 parts of Peregal O-15, 3 parts of oleic acid polyoxyethylene(6) ether, 4.5 parts of silicone polyether $E_5$, and 6 parts of silicone polyether $E_6$ and heat up to 80° C. while stirring, and let them to mix completely for 40 min at 80° C.; then, keep the temperature of the system, add water slowly, and increase the stirring rate to invert the water-in-oil emulsion to oil-in-water emulsion, continue adding water to the required mass concentration (60%). Emulsify further the mixture in a colloidal mill, to obtain the required silicone emulsion S4.

(5) Preparation of Silicone Emulsion S5:

At room temperature, mix 20 parts of G2, 20 parts of G1, 4.5 parts of Peregal O-20, 3 parts of sorbitan monostearate, 4.5 parts of silicone polyether $E_1$, and 6 parts of silicone polyether $E_5$ and heat up to 80° C. while stirring, and let them to mix completely for 40 min at 80° C.; then, keep the temperature of the system, add water slowly, and increase the stirring rate to invert the water-in-oil emulsion to oil-in-water emulsion, continue adding water to the required mass concentration (50%). Emulsify further the mixture in a colloidal mill, to obtain the required silicone emulsion S5.

2. Preparation of Solid Granular Defoamer

Embodiment 1

Add 70 g starch into a mixer, add 12.5 g silicone emulsion S2 into the mixer, and stir uniformly; then, add 5 g starch and stir uniformly, and add 2.5 g silicone emulsion S4 and stir uniformly. Next, add 2 g sodium carboxymethylcellulose and 3 g polyacrylic acid and continue stirring; after stirring uniformly, add 5 g absolute ethyl alcohol and stir uniformly, and then pellet and dry the obtained mixture, so as to obtain an embodiment 1 of granular defoamer.

Embodiment 2

Add 60 g sodium sulfate (800-mesh) into a mixer, add 16.5 g silicone emulsion S2 into the mixer, and stir uniformly; then, add 9 g sodium sulfate (800-mesh) and stir uniformly, and add 3.5 g silicone emulsion S5 and stir uniformly. Next, add 2 g sodium citrate and 3 g copolymer of maleic acid and acrylic acid and continue stirring ; after stir uniformly, add 3 g absolute ethyl alcohol and 3 g deionized water, and stir uniformly; then pellet and dry the obtained mixture, so as to obtain an embodiment 2 of granular defoamer.

Embodiment 3

Add 50 g sodium sulfate (1250-mesh) into a mixer, add 29 g silicone emulsion S3 into the mixer, and stir uniformly; then, add 9 g sodium carbonate (300-mesh) and stir uniformly, and add 2 g silicone emulsion S1 and 4 g silicone emulsion S2, and stir uniformly. Next, add 3 g polyacrylic acid and continue stirring; after stir uniformly, add 3 g deionized water and stir uniformly; then pellet and dry the obtained mixture, so as to obtain an embodiment 3 of granular defoamer.

Embodiment 4

Add 63 g sodium sulfate (300-mesh) into a mixer, add 14 g silicone emulsion S1 into the mixer, and stir uniformly; then, add 10 g cationic starch and stir uniformly, and add 3 g silicone emulsion S2 and stir uniformly. Next, add 8 g polyacrylic acid and continue stirring; after stir uniformly, add 2 g deionized water and stir uniformly; then pellet and dry the obtained mixture, so as to obtain an embodiment 4 of granular defoamer.

Embodiment 5

Add 65 g sodium sulfate (800-mesh) into a mixer, add 17 g silicone emulsion S1 into the mixer, and stir uniformly; then, add 7 g cationic starch and stir uniformly, and add 1.5 g silicone emulsion S3 and 1.5 g silicone emulsion S4, and stir uniformly. Next, add 3 g sodium carboxymethylcellulose and 3 g polymer of maleic acid and acrylic acid and continue stirring; after stir uniformly, add 2 g absolute ethyl alcohol and stir uniformly, and then pellet and dry the obtained mixture, so as to obtain an embodiment 5 of granular defoamer.

Embodiment 6

Add 60 g sodium sulfate (1250-mesh) into a mixer, add 18 g silicone emulsion S2 into the mixer, and stir uniformly; then, add 5 g sodium sulfate (1250-mesh) and stir uniformly, and add 2 g silicone emulsion S3 and stir uniformly. Next, add 3 g sodium carboxymethylcellulose, 3 g sodium citrate, and 4 g polyacrylic acid, and continue stirring; after stir uniformly, add 2 g absolute ethyl alcohol and 3 g deionized water, and stir uniformly; then pellet and dry the obtained mixture, so as to obtain an embodiment 6 of granular defoamer.

Embodiment 7

Add 50 g sodium sulfate (1250-mesh) into a mixer, add 12.6 g silicone emulsion S1 and 12 g silicone emulsion S2 into the mixer, and stir uniformly; then, add 5 g sodium carbonate (1250-mesh) and stir uniformly, and add 2 g silicone emulsion S4 and 3.4 g silicone emulsion S5, and stir uniformly. Next, add 2 g sodium carboxymethylcellulose, 5 g sodium citrate, and 3 g polyacrylic acid and continue stirring; after stir uniformly, add 5 g absolute ethyl alcohol and stir uniformly, and then pellet and dry the obtained mixture, so as to obtain an embodiment 7 of granular defoamer.

Embodiment 8

Add 55 g sodium carbonate (800-mesh) into a mixer, add 13 g silicone emulsion S2 into the mixer, and stir uniformly; then, add 10 g cationic starch and stir uniformly, and add 2 g silicone emulsion S5 and stir uniformly. Next, add 10 g polymer of maleic acid and acrylic acid and continue stirring; after stir uniformly, add 10 g deionized water and stir uniformly; then pellet and dry the obtained mixture, so as to obtain an embodiment 8 of granular defoamer.

Embodiment 9

Add 47 g sodium carbonate (800-mesh) into a mixer, add 10 g silicone emulsion S1 and 12 g silicone emulsion S2 into the mixer, and stir uniformly; then, add 10 g cationic starch and stir uniformly, and add 3 g silicone emulsion S3 and stir uniformly. Next, add 5 g sodium carboxymethylcellulose, 2 g sodium citrate, and 3 g polyacrylic acid, and continue stirring; after stir uniformly, add 8 g deionized water and stir uniformly, and then pellet and dry the obtained mixture, so as to obtain an embodiment 9 of granular defoamer.

Embodiment 10

Add 50 g sodium carbonate (800-mesh) into a mixer, add 12 g silicone emulsion S1 and 18 g silicone emulsion S2 into the mixer, and stir uniformly; then, add 5 g sodium carbonate (800-mesh) and stir uniformly, and add 5 g silicone emulsion S3, and stir uniformly. Next, add 4 g polyacrylic acid and continue stirring,; after stir uniformly, add 6 g deionized water and stir uniformly; then pellet and dry the obtained mixture, so as to obtain an embodiment 10 of granular defoamer.

Embodiment 11

Add 60 g sodium carbonate (1250-mesh) into a mixer, add 13 g silicone emulsion S2 into the mixer, and stir uniformly; then, add 5 g sodium carbonate (1250-mesh) and stir uniformly, and add 2 g silicone emulsion S3 and stir uniformly. Next, add 3 g sodium carboxymethylcellulose, 3 g sodium citrate, and 1 g polymer of maleic acid and acrylic acid, and continue stirring; after stir uniformly, add 5 g deionized water and 5 g absolute ethyl alcohol, and stir uniformly; then pellet and dry the obtained mixture, so as to obtain an embodiment 11 of granular defoamer.

Comparative Embodiment 1

Add 75 g starch into a mixer, add 10 g high-viscosity silicone grease mixture G1 and 5 g high-viscosity silicone grease mixture G2, and mix uniformly; then, add 2 g sodium carboxymethylcellulose and 3 g polyacrylic acid. After stirring uniformly, add 5 g absolute ethyl alcohol, and stir uniformly; pellet and dry the obtained mixture, so as to obtain a comparative embodiment 1 of granular defoamer.

Comparative Embodiment 2

Add 25 g starch, 25 g sodium sulfate (1250-mesh), and 25 g sodium carbonate (800-mesh) into a mixer, add 5 g high-viscosity silicone grease mixture G1 and 10 g high-viscosity silicone grease mixture G2, and mix uniformly; then, add 2 g sodium carboxymethylcellulose and 3 g polyacrylic acid. After stirring uniformly, add 3 g absolute ethyl alcohol and 2 g deionized water, and stir uniformly; pellet and dry the obtained mixture, so as to obtain a comparative embodiment 2 of granular defoamer.

3. Test of Foam Elimination and Suppression Performance

Test the embodiments of granular defoamer, comparative embodiments of granular defoamer, and samples of a foreign solid defoamer, with the following method.

(1) Test in Washing Machine

Testing method: add 50 g commercially available powder detergent and 0.3 g solid granular defoamer into a drum-type washing machine with 6 kg capacity, and test through the standard washing procedures. There are 5 measuring settings on the door of the washing machine. These settings indicate 0, 25%, 50%, 75%, and 100% of the door height, and are denoted as "0", "1", "2", "3", and "4" respectively. Setting "0" is the start point, and indicates "no foam", while mark "4" indicates "full foam". Record the foam height once every 5 min when the washing machine stops. A higher value indicates the foam height in the washing machine is higher and the foam suppression performance is poorer; within the same duration, a lower foam height indicates the foam suppression performance of the product is better. The test result is as follows:

TABLE 3

Washing Machine Test Result

| No. | | Time (min) | | | | | | | | |
|---|---|---|---|---|---|---|---|---|---|---|
| | | 0 | 5 | 10 | 15 | 20 | 25 | 30 | 35 | 40 |
| Embodiment 1 | M | 0 | 0 | <1 | <2 | ≤2 | <2 | <3 | >3 | 4 |
| | N | 0 | 0 | <1 | <2 | >2 | >2 | >3 | 4 | |
| Embodiment 2 | M | 0 | 0 | <1 | <1 | >1 | <2 | >2 | <3 | <3 |
| | N | 0 | 0 | 1 | >1 | >1 | ≤2 | >2 | >3 | >3 |
| Embodiment 3 | M | 0 | 0 | <1 | <1 | <2 | ≤2 | >2 | 2 | <3 |
| | N | 0 | 0 | >1 | <1 | ≤2 | >2 | >3 | 3 | >3 |
| Embodiment 4 | M | 0 | 0 | <1 | ≤2 | <2 | <3 | >3 | >3 | 4 |
| | N | 0 | 0 | >1 | >1 | >2 | >3 | >3 | 4 | |
| Embodiment 5 | M | 0 | 0 | <1 | ≤1 | <2 | <3 | >3 | >3 | 4 |
| | N | 0 | 0 | <1 | 1 | >2 | <3 | >3 | 4 | |
| Embodiment 6 | M | 0 | 0 | <1 | <1 | <2 | <2 | >2 | <3 | ≤3 |
| | N | 0 | 0 | <1 | <2 | <2 | <3 | <3 | ≤3 | 4 |
| Embodiment 7 | M | 0 | 0 | <1 | <1 | <1 | <2 | 2 | <3 | <3 |
| | N | 0 | 0 | <1 | <1 | <2 | ≤2 | 2 | <3 | ≤3 |
| Embodiment 8 | M | 0 | 0 | <1 | ≤2 | <2 | <2 | >3 | >3 | >3 |
| | N | 0 | 0 | 1 | ≤2 | <2 | <3 | >3 | 3 | 4 |
| Embodiment 9 | M | 0 | 0 | <1 | 1 | <2 | <2 | 2 | <3 | <3 |
| | N | 0 | 0 | <1 | 1 | <2 | <3 | 3 | >3 | 3 |
| Embodiment 10 | M | 0 | 0 | <1 | <1 | >1 | <2 | <2 | <3 | <3 |
| | N | 0 | 0 | <1 | <1 | ≤2 | ≤2 | ≤2 | <3 | ≤3 |
| Embodiment 11 | M | 0 | 0 | <1 | <2 | 2 | <2 | <3 | >3 | >3 |
| | N | 0 | 0 | <1 | 2 | >2 | >2 | >3 | >3 | 4 |
| Comparative embodiment 1 | M | 0 | <2 | <2 | <3 | >3 | <3 | >3 | 4 | |
| | N | 0 | <2 | 2 | <3 | >3 | >3 | 4 | | |
| Comparative embodiment 2 | M | 0 | 1 | <2 | <3 | <3 | <3 | >3 | 4 | |
| | N | 0 | 1 | 2 | <3 | <3 | >3 | 4 | | |
| Foreign sample | M | 0 | <2 | >2 | <3 | >3 | 4 | | | |
| | N | 0 | 2 | 3 | 4 | | | | | |

Note:
In the above table, "M" indicates test in real time; "N" indicates the sample is tested after it is held at 40° C. for four weeks.

(2) Horizontal Circular Bubbling Method:

Testing method: four measuring settings 0, 1, 2, and 3 are marked out on the glass test mirror of a horizontal circular bubbling instrument (produced by Nanjing Sixin Scientific-Technological Application Research Institute Co., Ltd.). Setting "0" is the start point, and indicates "no foam", while setting "3" indicates "full foam". Add 14 kg of 0.3% water solution of sodium dodecyl benzene sulfonate (pH is 13) into the horizontal circular bubbling instrument, switch on the temperature control switch, heat up the foaming liquid to test temperature of 80° C., start the air pump and wait for the foams to rise to a specific height (the time required for the foams to rise to the height is the blank time), and then add 0.5 g defoamer into the liquid; record the change of foam height with time. The longer the time required for the foams to rise to the same height is, the higher the foam suppression performance is. The test result is shown in Table 4:

TABLE 4

Test Result in Horizontal Circular Bubbling Instrument

| | Foam Height | Blank | 0 | 1 | 2 | 3 |
|---|---|---|---|---|---|---|
| Foam suppression time | Embodiment 1 | 3'03" | 2'40" | 6'24" | 28'30" | 32'26" |
| | Embodiment 2 | 3'07" | 2'25" | 6'37" | 26'54" | 34'36" |
| | Embodiment 3 | 3'09" | 2'20" | 5'58" | 25'21" | 34'46" |
| | Embodiment 4 | 3'06" | 2'42" | 5'30" | 22'21" | 33'40" |
| | Embodiment 5 | 3'07" | 2'33" | 6'30" | 23'21" | 30'40" |
| | Embodiment 6 | 3'03" | 2'27" | 4'30" | 25'21" | 35'45" |
| | Embodiment 7 | 3'06" | 2'29" | 6'01" | 24'23" | 36'43" |
| | Embodiment 8 | 3'05" | 2'25" | 6'04" | 28'32" | 32'40" |
| | Embodiment 9 | 3'04" | 2'15" | 6'42" | 29'30" | 34'06" |
| | Embodiment 10 | 3'03" | 2'20" | 6'50" | 30'23" | 38'43" |
| | Embodiment 11 | 3'06" | 2'35" | 5'25" | 25'21" | 30'10" |
| | Comparative embodiment 1 | 3'09" | 1'40" | 5'40" | 15'01" | 17'46" |
| | Comparative embodiment 2 | 3'05" | 1'45" | 4'40" | 14'07" | 18'23" |
| | Foreign sample | 3'07" | 1'13" | 4'18" | 9'45" | 13'32" |

It is seen from above test: the granular defoamer prepared by controlling the silicone emulsion to agglomerate to the carrier in steps is homogeneous and has stable defoaming performance. It can achieve satisfactory defoaming effect in the early stage and prolonged release of the active substances in the entire process at a low dosage, and ensure satisfactory foam elimination and suppression in the entire washing process. Moreover, after it is held for four weeks at 40° C., its foam elimination and suppression performance is not changed much; in other words, it has preferable anti-decay characteristic.

The invention claimed is:

1. A granular defoamer, wherein, the granular defoamer comprises:
   A. a carrier: selected from sulfate, carbonate, phosphate, polyphosphate, starch, cellulose or aluminosilicate, can be used separately or in mixture, dosed at 55~75% of total mass of the granular defoamer, and divided into two parts A1 and A2, with mass ratio of A1 to A2 equal to 4:1~15:1;
   B. a silicone emulsion: prepared from silicone grease, silicone polyether, emulsifying agent, and deionized water, dosed at 15~35% of total mass of the granular defoamer, and divided into two parts B1 and B2, with mass ratio of B1 to B2 equal to 4:1~10:1;
   C. a texturing agent: selected from acrylic polymer, cellulose ether, citric acid, citrate, or polyvinylpyrrolidone, can be used separately or in mixture at any mix ratio, dosed at 3~10% of total mass of the granular defoamer;
   D. a solvent: prepared from alcohol and/or water, can be used separately or in mixture at any mix ratio, dosed at 2%~10% of total mass of the granular defoamer.

2. The granular defoamer according to claim 1, wherein, the carrier is sulfate or carbonate or starch, each with particle size greater than 300-mesh.

3. The granular defoamer according to claim 1, wherein, the solvent is ethanol and/or water.

4. The granular defoamer according to claim 1, wherein, the two parts A1 and A2 of the carrier can have identical composition or different compositions.

5. The granular defoamer according to claim 1, wherein, the two parts B1 and B2 of the silicone emulsion can have identical composition or different compositions.

6. A method for preparation of the granular defoamer according to claim 1 comprises:
   (1) adding carrier A1 into a mixer, and then adding silicone emulsion B1 into the mixer and stirring uniformly;
   (2) adding carrier component A2 into the mixture obtained in step (1), and stirring uniformly;
   (3) adding silicone emulsion B2 into the mixture obtained in step (2) and after stirring and mixing uniformly, adding the texturing agent and stirring uniformly, and then adding the solvent and stirring uniformly;
   (4) pelleting and drying the mixture obtained in step (3).

7. The method for preparation of the granular defoamer according to claim 6, wherein, the carrier is sulfate or carbonate or starch, each with particle size greater than 300-mesh.

8. The method for preparation of the granular defoamer according to claim 6, wherein, the solvent is ethanol and/or water.

9. The method for preparation of the granular defoamer according to claim 6, wherein, the two parts A1 and A2 of the carrier can have identical composition or different compositions.

10. The method for preparation of the granular defoamer according to claim 6, wherein, the two parts B1 and B2 of the silicone emulsion can have identical composition or different compositions.

* * * * *